J. W. ANDERSON.

Wagon-Brake Lever.

No. 8,006. Reissued Dec. 25, 1877.

Witnesses.

W. C. Corlies.

Jno. C. MacGregor.

Inventor.

John W. Anderson by Johnson & Thacher

Attorneys

N. PETERS, PHOTO-LITHOGRAPHER, WASHINGTON, D. C.

UNITED STATES PATENT OFFICE.

JOHN W. ANDERSON, OF SOUTH BEND, INDIANA.

IMPROVEMENT IN WAGON-BRAKE LEVERS.

Specification forming part of Letters Patent No. 187,579, dated February 20, 1877; Reissue No. 8,006, dated December 25, 1877; application filed August 25, 1877.

*To all whom it may concern:*

Be it known that I, JOHN W. ANDERSON, of South Bend, in the county of St. Joseph and State of Indiana, have invented a new and useful Improvement in Wagon-Brakes, which is fully described in the following specification, reference being had to the accompanying drawings, in which—

Figure 1:
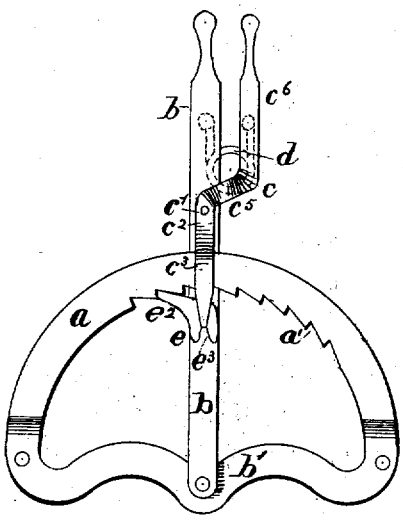
Figure 2:
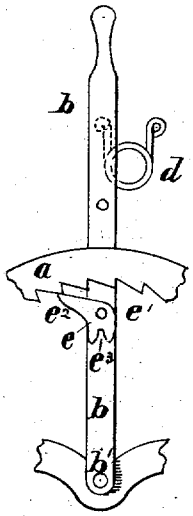
Figure 3:
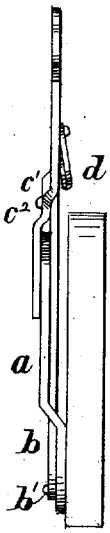
Figure 4:
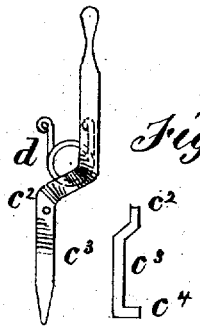
Figure 5:
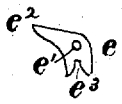

Figure 1 is a front elevation. Fig. 2 is the main operating-lever with dog or pawl attached, and the segmental rack. Fig. 3 is a side or edge view, and Figs. 4 and 5 are detail views.

My invention relates to devices for operating wagon-brakes; and it consists in various combinations of special devices, all of which will be hereinafter more fully set forth.

In the drawings, *a* is the segment-rack, having the ratchet-teeth *a'* on its lower edge. The rack *a* is secured rigidly and substantially to the side-board of the wagon-box, and is slightly set off therefrom to make room for the actuating-lever *b*.

The lever *b* has its fulcrum on the pin *b'*, the axis of which is concentric with the segment-rack *a*. The lever *b* is made straight, and provided with necessary holes for making connection with the brakes.

*c* is the lever for operating the dog or pawl, which engages with the teeth *a'*. It has its fulcrum on the pin $c^1$ on the lever *b*, above the segment-rack *a*. For some distance above and below its fulcrum it lies against the lever *b*, thus providing a parallel bearing-surface, $c^2$, which gives greater strength and steadiness to its movements.

Above the parallel bearing $c^2$ the lever *c* is bent forward and sidewise in the direction of the line of the lever *b* at $c^5$, and then upward, so as to bring the upper portion $c^6$ nearly parallel with and in the same plane with lever *b*. Below the parallel bearing $c^2$ it bends outward from the lever *b*, and downward, as at $c^3$, so as to embrace the dog between the levers *b* and *c*.

I prefer making it in the form here shown, with the lever *b* inside the segment-rack *a*, and with the dog engaging in teeth on the under side of the rack; but it is evident that the position of the levers on the rack may be reversed, and the lever *b* placed on the outside of the rack instead of the inside, and the teeth and dog may be placed on the upper side of the segment-rack instead of the lower, all without changing the principles of construction and operation of the lever *c*.

The handles of the levers *b* and *c* are made and arranged so that they can be conveniently grasped by the hand and brought close together.

It will be seen that when the lever *c* is pivoted to the lever *b*, as described, the segment *a* will be embraced between the levers, the latter being held firmly in place, and all variations or wabblings effectually prevented.

*d* is a spring attached to the upper ends and on the inner sides of the levers *b* and *c*. It acts on the lever *c*, which connects with the pawl, and causes the latter to engage in the teeth *a'* on the under edge of the segment *a*.

*e* is the dog or pawl, secured by the pin $e^1$, on which it turns, to the lever *b*, either below or above the segment-rack *a*, as desired, and so that the point $e^2$ will engage in the teeth *a'*.

I prefer attaching the lever *c* to the dog *e* by forming a slot, $e^3$, in the dog *e*, into which projects a pin, $c^4$, from the lever *c*, when, by turning slightly the lever *c* on its fulcrum $c^1$, the dog *e* is turned on its fulcrum $e^1$, and engaged or disengaged with the teeth of the ratchet *a*; but I do not wish to be confined to this particular mode of attaching the lever *c* to the dog *e*, as it will be readily seen that other attachments may be substituted without changing the principle of construction.

The simplicity of the construction of my brake-lever will be readily seen.

I dispense with all guide-frames and complicated machinery for giving steadiness or effectiveness to the operation of the device. The levers themselves make the necessary guide-slots or frames, while the handles are arranged so that they may readily be grasped and operated by one hand, and any of the parts may be made or repaired by ordinary mechanics.

Having described my invention, what I claim, and desire to secure by Letters Patent, is—

1. The actuating-lever *b*, in combination with the pawl-lever *c*, constructed as described, with a portion, $c^2$, parallel to the lever *b*, a forward, side, and upward bend, $c^5$, above its pivot, and a side and downward bend, $c^3$, below said pivot, substantially as and for the purpose set forth.

2. The lever $c$, bent in the manner described, in combination with the brake-lever $b$ and the pawl $e$, pivoted to the latter, and connected to the lever $c$ in such a manner that the vibration of said lever will turn the pawl on its pivot, substantially as and for the purpose set forth.

3. The brake-lever $b$, in combination with the segment $a$ and the lever $c$, bent in the form described, and provided with the pin $c^4$, substantially as and for the purpose described.

4. The brake-lever $b$, in combination with the lever $c$, provided with the pin $c^4$, the pawl $e$, having a slot, $e^3$, and the segment-rack $a$, substantially as and for the purpose set forth.

5. The brake-lever $b$, in combination with the lever $c$, provided with a parallel bearing, $c^2$, above the segment-rack $a$, and the forward, sidewise, and upward bend $c^5$, the pawl $e$, having a slot, $e^3$, and the segment-rack $a$, substantially as and for the purposes set forth.

JOHN W. ANDERSON.

Witnesses:
ISAAC FRY,
G. H. ASIRE.